United States Patent [19]

Boos

[11] Patent Number: 5,227,922
[45] Date of Patent: Jul. 13, 1993

[54] MIRROR BOX

[76] Inventor: Tululah J. Boos, 4320 S. Aspen Pl., Broken Arrow, Okla. 74011

[21] Appl. No.: 930,786

[22] Filed: Aug. 17, 1992

[51] Int. Cl.[5] ............................ G02B 5/08; A63J 5/00
[52] U.S. Cl. ...................................... 359/857; 472/57; 40/427
[58] Field of Search ............... 359/838, 839, 850, 857, 359/861, 871; 472/57, 58, 63, 75; 40/367, 409, 411, 421, 427

[56] References Cited

U.S. PATENT DOCUMENTS

| | | | |
|---|---|---|---|
| 769,799 | 9/1904 | Hopkins | 472/63 |
| 909,450 | 1/1909 | Perkins . | |
| 999,512 | 8/1911 | Miele . | |
| 1,266,014 | 5/1918 | Gribble et al. | 472/58 |
| 1,993,836 | 3/1935 | Gill et al. | 272/13 |
| 2,103,321 | 12/1937 | De Deza et al. | 88/75 |
| 2,117,635 | 5/1938 | Sprague | 272/13 |
| 2,266,089 | 12/1941 | Shipman | 272/13 |
| 2,359,069 | 9/1944 | White | 472/58 |
| 2,390,610 | 12/1945 | Modern et al. | 177/327 |
| 2,483,901 | 10/1949 | Harris | 272/8 |
| 2,597,605 | 5/1952 | White | 272/8.5 |
| 3,156,758 | 11/1964 | Tregubenko | 88/75 |
| 3,610,918 | 10/1971 | Barlow | 240/10 |
| 3,614,213 | 10/1971 | Mahoney | 350/299 |
| 3,647,284 | 3/1972 | Elings et al. | 350/294 |
| 3,823,500 | 7/1974 | Spitz | 40/219 |
| 4,040,726 | 8/1977 | Paca | 359/636 |
| 4,180,931 | 1/1980 | Osch | 472/58 |

FOREIGN PATENT DOCUMENTS

| | | | |
|---|---|---|---|
| 346060 | 1/1937 | Italy | 40/367 |
| 2217891 | 8/1990 | Japan . | |
| 2027969 | 2/1980 | United Kingdom . | |

*Primary Examiner*—Bruce Y. Arnold
*Assistant Examiner*—R. D. Shafer
*Attorney, Agent, or Firm*—William S. Dorman

[57] ABSTRACT

The present invention is a decorative mirror box provided with a hollow interior cavity. The interior cavity is defined by a bottom, a roof, and reflective interior surfaces on a front wall, a back wall, a right side wall, and a left side wall. Optionally, the bottom can be provided with an interior surface which is reflective. The walls attach perpendicularly to the bottom. The side walls are spaced apart and are parallel to each other. The front wall attaches perpendicularly to the side walls and is provided with an opening to provide visual access to the interior cavity. The back wall attaches to the side walls so that the back wall is spaced away from the front wall so that the back wall interior surface is not parallel with the front wall interior surface A roof attaches to the front wall, the back wall, the right side wall, and the left side wall. An interior surface of the roof is provided with a light source for illuminating the interior cavity. Ornamental objects are mounted in the interior cavity to create a fanciful miniature scene. The mirror box is provided with a means of opening to allow the ornamental objects to be repositioned or replaced.

2 Claims, 1 Drawing Sheet

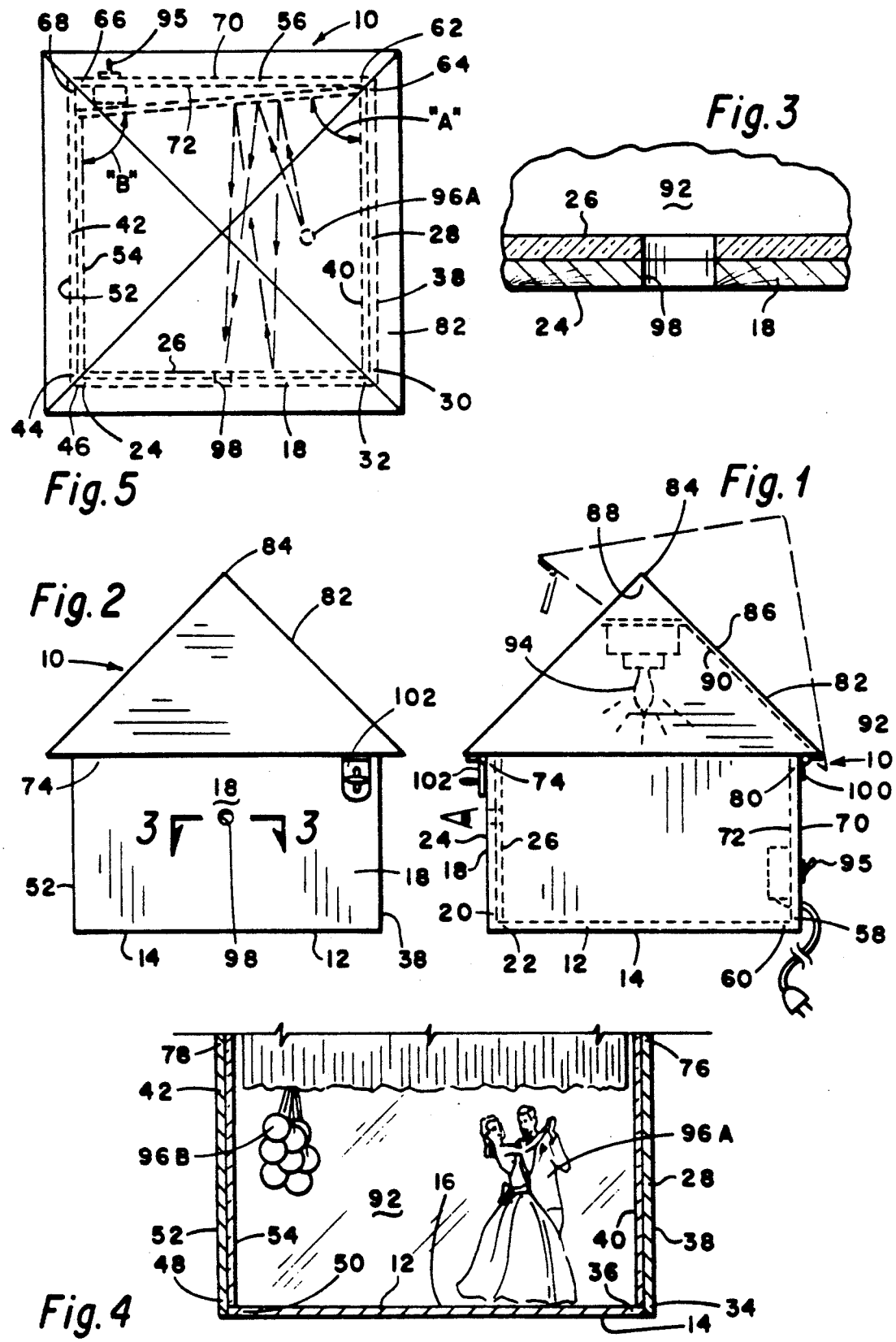

MIRROR BOX

BACKGROUND OF THE INVENTION

1. Field of the Invention

The present invention is a decorative mirror box provided with interior reflective surfaces. More specifically, the present invention is a mirror box having a small opening in one of the reflective walls permitting a person to observe the interior cavity of the box by looking through the opening. The interior cavity of the box is decorated with various ornamental objects to provide a fanciful miniature scene to the observer.

2. The Prior Art

Boxes containing interior reflective surfaces are known in the art as means for displaying jewelry and other merchandise. These display boxes allow several sides of merchandise to be viewed without touching or moving the merchandise. These display boxes normally have a clear or transparent piece of material through which the observer views the merchandise. However, the clear or transparent piece of material also permits a reflection of the observer to pass into the box and be reflected by the interior reflective surfaces. The reflection of the observer on the reflective surfaces is not distracting when merchandise is being displayed in the box, but when the box is used to create a fanciful miniature scene, such as in the case of the present invention, the observer's reflection is undesirable.

The present invention minimizes this undesirable reflection by providing a small opening in a reflective wall of the box through which the observer can look to view the interior of the box. Also to help eliminate the observer's reflection, a light source is provided within the box as a means of illuminating the box's interior. Utilizing the interior light source, the observer can dim or eliminate lighting exterior to the box when viewing the interior of the box, thus further minimizing the observer's reflection within the box.

Another drawback with prior art display boxes when used to create a fanciful miniature scene is that they generally are provided with parallel front and back reflective interior surfaces. When the front and back reflective interior surfaces are parallel, the observer sees objects within the box as a tunnel-like series of identical reflections which diminish in size. This orderly repetitive appearance is not desirable when attempting to create a fanciful miniature scene.

The present invention overcomes this problem by providing a back reflective interior surface which is not parallel with the front reflective interior surface. In providing non-parallel front and back reflective surfaces, the present invention creates reflections of the objects within the box which the observer sees as randomly located images of varying sizes and which are seen from varying perspectives around the box's reflective interior surfaces. The effect achieved from this arrangement of front and back reflective interior surfaces is useful in creating a fanciful miniature scene.

SUMMARY OF THE INVENTION

Briefly, the present invention is a decorative mirror box provided with the following structural elements: a bottom, a front wall, a right side wall, a left side wall, a back wall and a roof; each structural element has an interior surface Collectively, the interior surfaces define an interior cavity of the mirror box. The interior surface of at least the front, back, left side, and right side walls are reflective. The left and right side walls are parallel with one another, but the front and back walls are not parallel with one another The interior surface of the roof is provided with a light source for illuminating the interior cavity. Ornamental objects are mounted within the interior cavity in order to provide a fanciful miniature scene. The front wall is provided with an opening through which the scene within the interior of the miniature box can be viewed and the mirror box is provided with means by which the box can be opened in order to rearrange or replace the ornamental objects located within the interior cavity.

BRIEF DESCRIPTION OF THE DRAWINGS

FIG. 1 is a right side elevation of a mirror box constructed according to a preferred embodiment of the present invention;

FIG. 2 is a front plan view of the mirror box shown in FIG. 1;

FIG. 3 is a cross-sectional view taken along line 3—3 of FIG. 2;

FIG. 4 is a front plan view of the mirror box with the front wall removed showing ornamental objects mounted within the interior cavity; and FIG. 5 is a top plan view of the mirror box schematically illustrating the visual effect created by the non-parallel front and back reflective interior surfaces

DETAILED DESCRIPTION OF THE PREFERRED EMBODIMENTS

Referring now to the drawings and initially to FIGS. 1 and 2, there is illustrated a mirror box, generally designated by reference numeral 10, constructed according to a preferred embodiment of the present invention. The box 10 is provided with a bottom 12. The bottom 12 has a bottom exterior surface 14 which serves as a base on which the box 10 rests and an opposite bottom interior surface 16. Although not illustrated as such, the bottom interior surface 16 is optionally reflective.

A front wall 18 attaches perpendicularly by its front wall bottom edge 20 to a bottom front edge 22 provided on the bottom 12. The front wall 18 is provided with a front wall exterior surface 24 and an opposite front wall interior surface 26. The front wall interior surface 26 is reflective.

A right side wall 28 attaches perpendicularly by its right side front edge 30 to a front wall right edge 32 provided on the front wall 18. The right side wall 28 also attaches perpendicularly by its right side bottom edge 34 to a bottom right edge 36 provided on the bottom 12. The right side wall 28 is provided with a right side exterior surface 38 and an opposite right side interior surface 40. The right side interior surface 40 is reflective.

Likewise, a left side wall 42 attaches perpendicularly by its left side front edge 44 to a front wall left edge 46 provided on the front wall 18 opposite the front wall right edge 32. The left side wall 42 also attaches perpendicularly by its left side bottom edge 48 to a bottom left edge 50 provided on the bottom 12 opposite the bottom right edge 36. The left side wall 42 is provided with a left side exterior surface 52 and an opposite left side interior surface 54. The left side interior surface 54 is reflective. The left side interior surface 54 is parallel with and faces toward the right side interior surface 40 and is spaced therefrom.

As illustrated in FIGS. 1 and 5, a back wall 56 attaches perpendicularly by its back wall bottom edge 58 to a bottom back edge 60 provided on the bottom 12 opposite the bottom front edge 22. The back wall 56 is provided with a back wall exterior surface 70 and an opposite back wall interior surface 72. The back wall interior surface 72 is reflective and faces toward the front wall interior surface 26 and is spaced therefrom. The back wall 56 attaches by its back wall right edge 62 to a right side back edge 64 provided on the right side wall 28 opposite the right side front edge 30 so that the back wall interior surface 72 is not perpendicular to the right side wall 28. Rather, an angle "A" which is formed between the back wall interior surface 72 and the right side wall 28 is either slightly more than 90 degrees, i.e. an obtuse angle, or is slightly less than 90 degrees, i.e. an acute angle.

Likewise, the back wall 56 attaches by its back wall left edge 66 to a left side back edge 68 provided on the left side wall 42 opposite the left side front edge 44, thus forming an angle "B" between the back wall interior surface 72 and the left side wall 42. The sum of angles "A" and "B" will always be 180 degrees. Therefore, whenever angle "A" is an obtuse angle, angle "B" will be an acute angle and vice versa. The angles "A" and "B" are not critical, nor does it matter which angle "A" or "B" is obtuse and which is acute, so long as the angles "A" and "B" are not right angles. The back wall interior surface 72 must not be parallel with the front wall interior surface 26 in order to create a proper illusion within the box 10.

A roof 82 is provided on the box 10 attaching to a front wall upper edge 74, a right side upper edge 76, a left side upper edge 78 and a back wall upper edge 80 provided respectively on the front wall 18 opposite the front wall bottom edge 20, on the right side wall 28 opposite the right side bottom edge 34, on the left side wall 42 opposite the left side bottom edge 48, and on the back wall 56 opposite the back wall bottom edge 58. The roof 82 may be of a wide variety of shapes, for example, a church building roof (not shown), a school house roof (not shown), etc. The roof 82 has a peak 84 on its roof exterior surface 86 and a corresponding vaulted ceiling 88 on its opposite roof interior surface 90.

The interior surfaces 16, 26, 40, 54, 72 and 90 enclose an interior cavity 92 of the box 10. A light source 94 is provided on the vaulted ceiling 88 to illuminate the interior cavity 92 and to illuminate the interior surfaces, i.e. the bottom interior surface 16, the front wall interior surface 26, the right side interior surface 40, the left side interior surface 54, the back wall interior surface 72 and the roof interior surface 90. The light source 94 is illustrated in FIG. 1 as having a switch 95 mounted on the mirror box 10 as a means of turning the light source 94 on and off. Alternately, the light source 94 may be provided with an in-line switch (not illustrated) or may operate off of D.C. current provided by batteries (also not illustrated).

As shown in FIGS. 3 and 4, a multiplicity of ornamental objects 96A, 96B, etc. are mounted in the interior cavity 92 of the box 10 to create a fanciful miniature scene which can be viewed through an opening 98 provided in the front wall 18 by an observer (not shown) located adjacent the front wall exterior surface 24.

As illustrated in FIG. 1, the mirror box 10 is provided with a hinge 100 as a means of opening the mirror box 10 and a latch 102 as a means of securing the mirror box 10 closed. It is necessary to open the mirror box 10 in order to rearrange or replace the ornamental objects 96A, 96B, etc. Optionally, other means of opening and securing the mirror box 10 are contemplated, and the present invention is not limited to the specific means illustrated. Also, means of opening the mirror box 10 may involve either movement or removal of the bottom 12, the roof 82, or the walls 18, 28, 42 or 56, or any combination thereof.

Whereas, the present invention has been disclosed in terms of the specific structure described above, it should be understood that other and further modifications, apart from those shown or suggested herein, may be made within the spirit and scope of this invention.

What is claimed is:

1. A mirror box containing a fanciful miniature scene viewable by an observer located outside the mirror box comprising:
    a bottom,
    a front wall being attached perpendicularly to the bottom, the front wall having an opening therein to provide visual access to the mirror box by the observer,
    a right side wall and a left side wall each being attached perpendicularly to the front wall and being attached perpendicularly to the bottom so that the right and left side walls are spaced apart and are parallel with each other,
    a back wall being attached perpendicularly to the bottom and being attached to the right and left side walls so the back wall is spaced apart from the front wall,
    reflective interior surfaces being provided on at least the front, the back wall, the right side wall and the left side the back wall interior surface being located so as to not be parallel with the front wall interior surface,
    a roof being attached to the front wall, the back wall, the right side wall and the left side wall so as to define an interior cavity within the mirror box,
    the roof being provided with a light source as a means of illuminating the interior cavity, ornamental objects being mounted within the interior cavity and, means for opening the mirror box.

2. A mirror box according to claim 1 further comprising:
    a reflective interior surface being provided on the bottom.

* * * * *